REMOTELY CONTROLLABLE TELEGRAPHIC SYSTEM
Filed Feb. 8, 1968
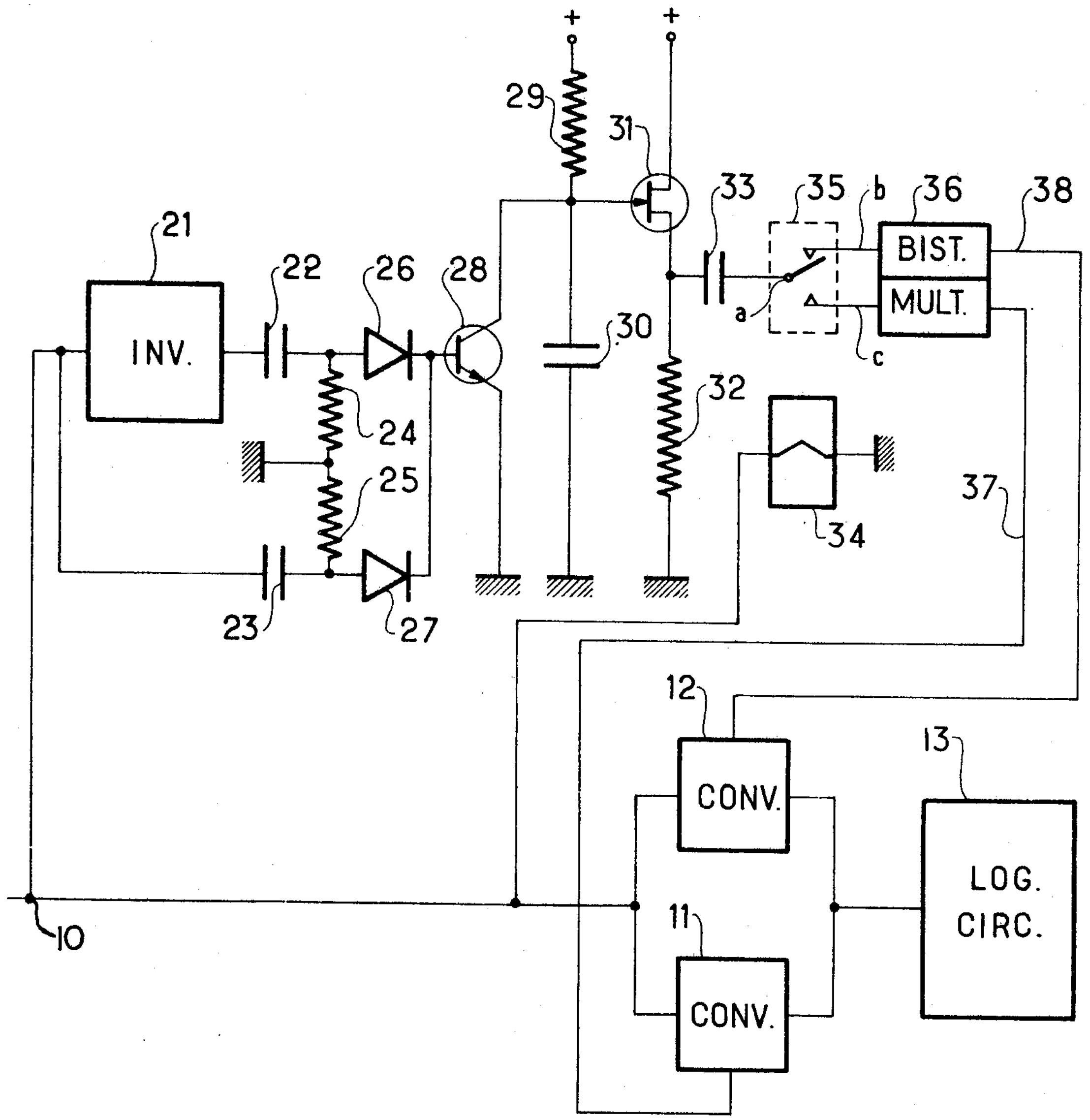
INVENTORS
ALBERT AMEAU
PIERRE BIZET
BY: Craig & Antonelli
ATTORNEYS United States Patent Office 3,511,923
Patented May 12, 1970

3,511,923

REMOTELY CONTROLLABLE TELEGRAPHIC SYSTEM

Albert Ameau, Paris, and Pierre Bizet, Fontenay-aux-Roses, France, assignors to C.I.T.-Compagnie Industrielle des Telecommunications, Paris, France, a corporation of France Filed Feb. 8, 1968, Ser. No. 704,164
Claims priority, application France, Feb. 14, 1967, 94,927
Int. Cl. H01l 7/02
U.S. Cl. 178—4.1 7 Claims

ABSTRACT OF THE DISCLOSURE

Device for the remote switching between a pair of signal converters at a distant station of a data transmission link from which the telegraphic speed may take respectively different values, wherein the switching is effected by the reception of a monotonic sequence (either "1," or "0") with a duration which is longer than the longest monotonic sequence likely to be encountered in the course of a data transmission.

The present invention relates to a remote control system for transmission of data, and more specifically for distant control of telegraphic reception equipment arranged to operate at two telegraphic speeds.

For transmission of data on telephone lines, it is advantageous to possess signal converters arranged to operate at two speeds, for example at 1200 bauds (so-called mode II), or at 600 bauds (so-called mode I), depending on whether the quality of the line is normal or poor. The choice of telegraphic speed depends on the undertakings concerned. In certain systems however, the operation of one of the terminals or stations is wholly automatic, only the other one of these being attended by an operator. This operator must therefore be able to remotely control the operation of the set at the distant terminal or station, this evidently being an essential condition for conjoint operation of the two sets of equipment.

In a known solution for this problem, the operator transmits an order for initiation of positional balancing of the converter in the equipment of the distant station on an outgoing line, and in response thereto instantaneous notification of the momentary condition of the distant converter is provided on a return line. The operator terminates the transmission of the balancing order when the said converter is set to the required condition, as evidenced by the return signal.

The object of the present invention is to find a much simpler and more economical solution for this problem. For this solution, it is assumed that a limitation on the maximum period for monotonic sequences is possible. It is assumed that all the sequences of identical valency, that is to say uninterrupted runs of the symbol 1 or of the symbol 0, will assuredly have a shorter duration than a limiting period, referred to as period $t_3$ hereinafter.

According to the invention, an unattended terminal of a telegraphic connection equipped with two converters capable of working at a first telegraphic speed I and at a second telegraphic speed II, respectively, comprises means for switching the converters, a delaying element arranged to transmit a pulse at the end of a period $t_2$ after the final transition received, notwithstanding the direction of the said transition, the said period $t_2$ amounting to between the time $t_3$ defined above, and a time $t_1$, the duration of a monotonic sequence or run transmitted on the line systematically from the attended terminal while simultaneously interrupting the transmission of data, for example a monotonic run S having the valency 1 for switching the demodulator corresponding to the telegraphic speed I, or monotonic run having the valency 0 for switching the demodulator corresponding to the telegraphic speed II, and means for sampling or monitoring the sequence of duration $t_1$ in process of reception at the time $t_2$ after the final transition received.

Under these circumstances, if the final transition had been received just at the beginning of the monotonic run S, it is apparent that the characteristic valency will still be received at the end of the time $t_2$, since $t_2$ is shorter than $t_1$. If however the final transition had been received at a time earlier by $t_3$ than the start of the monotonic run S, this monotonic run is still in process of reception at the time $t_2$, after conclusion of the final transition, since $t_3$ is certainly shorter than $t_2$.

By contrast, if a monotonic run of the data transmission never exceeds $t_3$, a positional order will never be unintentionally obtained as a result of the transmission of data.

The invention will now be described with reference to the accompanying drawing, which provides a schematic circuit diagram of the invention, but in no restrictive sense.

In the drawing, an unattended terminal of a telegraph line 10 for transmission of data, designed to work at two telegraphic speeds, comprises two converters 11 (for the speed I) and 12 (for the speed II) connected in parallel between the line 10 and a control apparatus 13 provided in the form of analogical circuits.

The station has a branch circuit comprising an analogical inverter 21 the output and input terminals of which are connected by way of capacitors 22 and 23 to diodes 26 and 27, respectively, each also being connected to ground through the resistors 24 and 25. The diodes 26 and 27 are jointly connected to the base electrode of a transistor 28 which controls the charging and discharging of a capacitor 30 through a resistor 29. A unijunction transistor 31 has its emitter connected to the collector of the transistor 28, a base terminal connected to the positive pole of a power supply, the other base terminal being grounded through a resistor 32. This last base terminal is connected through a capacitor 33 to a point common to a switch or inverter 35 which may be controlled by a relay 34 fed by a branch from the line 10. The output terminals *b* and *c* of the switch 35 feed the two corresponding input terminals of a bistable switching element 36, whereof one output terminal causes the triggering of the converter 11 through the connection 37, and the other output terminal causes the triggering of the converter 12 through the connection 38.

The unijunction transistor 31 is arranged as a delaying element according to a known arrangement. A positive current pulse at the base of transistor 28 will discharge capacitor 30 and prevent the firing of the unijunction transistor 31. As long as a positive current is maintained at the base of transistor 28, no voltage will be developed across capacitor 30. When the base current is removed, the voltage across capacitor 30 will rise and the unijunction transistor 31 will fire at the end of the time interval determined by the values of resistor 29 and capacitor 30.

When a transition arrives at the input terminal of the inverter 21, it causes the appearance of a positive pulse at the base of the transistor 28, irrespective of its polarity, either via rectifier 26 or rectifier 27 due to the presence of inverter 21 in one path. This results in discharging the capacitor 30, as indicated above. The period $t_2$, being the period of delay of the delay arrangement, begins to run from this moment.

The delay arrangement transmits a pulse, for example a positive pulse, when the time $t_2$ has elapsed. If the monotonic sequence S is a sequence of 0 symbols at this moment, this pulse is transmitted by the pole *b* of the switch 35, and the bistable switching element 36 brings the converter 12 into action (case shown in the figure). If the monotonic sequence S is a run of 1 symbols, the relay 34 is energized, the pulse is received at the pole *c* of the switch 35, and the bistable switching element 36 brings the converter 11 into action.

A description will be given of the possible ways of applying the process of the invention within the range of the frequencies standardized by the CCITT for transmission of data at 1200 bauds or at 600 bauds. These frequencies correspond to the following table:

| | Mode I transmission at 600 bauds (c./s.) | Mode II transmission at 1200 bauds (c./s.) |
|---|---|---|
| Symbol 1 or still | 1,300 | 1,300 |
| Symbol 0 or working | 1,700 | 2,100 |
| Central frequency | 1,500 | 1,700 |

When mode I is chosen, the apparatus for processing or conversion of the data should be set to operate at 600 bauds, whereas for mode II it should be set to operate at 1,200 bauds.

The operator in setting up the equipment, for example, depresses a knob marked "600 bauds" when he wishes to set the operation at 600 bauds. The result is that the equipment for processing data and the converter of the attended station is set to 600 bauds immediately, or in eliciting confirmation of this situation. The transmission of data is interrupted at the same time and is replaced by transmission of the symbol 1 (frequency 1,300 c./s.) during a period $t_1$. Under these circumstances, expiration of the delay $t_2$ at the distant station has the result of setting the distant equipment at 600 bauds.

The operator also, for example, depresses a second knob marked "1,200 bauds" if the operation at 1,200 bauds is to be selected. This results in the immediate setting at 1,200 bauds of the equipment for processing data and the converter of the attended station, or in eliciting confirmation of this situation. The transmission of data is interrupted at the same time and is replaced by transmission of the symbol 0 (frequency 2,100 c./s.) during the same time $t_1$. Under these circumstances, expiration of the delay $t_2$ at the distant station has the result of setting the distant equipment at 1,200 bauds.

It should be noted that if the equipment of the distant station is set to 1,200 bauds, the switching order on 600 bauds reaches the same in the form of signals at the frequency of 1,300 c./s. This frequency being shared by the two modes, it will be detected without fail. By contrast, if the equipment is set to 600 bauds, the switching order reaches it in the form of signals at the frequency of 2,100 c./s. This frequency lies outside the coding range of mode I, and in this case, application of the process of the invention thus presupposes that the discriminator of mode I has a working range exceeding the 1,300–1,700 c./s. band, and extending at least up to 2,100 c./s.

The period $t_1$ during which the transmitting station proceeds with emission of constant valency is not of critical value, and a value equal to $(n+0.5)$ $t_2$ will advantageously be chosen for the same, *n* being a small integer, and not equal to zero.

We have shown and described one embodiment in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are within the ability of one of ordinary skill in the art.

What is claimed:

1. A remote control system responsive to control from an attended station to an unattended remote station of a telegraphic system equipped with two converters connected in parallel to a line and designed to operate at a first telegraphic speed and at a second telegraphic speed, respectively, comprising delaying means responsive to receipt of a transition on said line for generating an actuating pulse at the end of a period $t_2$ after the final transition received irrespective of the polarity of the said transition, the said period $t_2$ having a duration between that of the period $t_3$ of the longest monotonic run apt to be received during transmission of data and a period $t_1$ amounting to the duration of a monotonic sequence S transmitted systematically over the line from the attended station while at the same time interrupting the transmission of data, and switching means responsive to the polarity of the sequence S in process of reception at the time $t_2$ after the final transition received for connecting said actuating pulse from said delaying means in actuation of a respective one of said converters.

2. A remote control system as defined in claim 1, wherein said delaying means includes an analogical inverter connected to said line, two diodes connected respectively to the input and output of said inverter, a transistor having its control electrode connected to said two diodes, a unijunction transistor arranged as a delaying element having its control electrode connected to the output of said transistor and to a capacitor in parallel therewith, and said switching means includes a bistable switching device arranged to be actuated by the current received over the line for selectively connecting the output of said delaying element to one of said converters.

3. A remote control system responsive to control from an attended station to an unattended remote station of a telegraph system equipped with a transmission line and first and second converters connected to said transmission line in parallel and capable of operating at first and second speeds, respectively, comprising control means connected to said transmission line for generating a control pulse a predetermined delay time after receipt of a final transition on said transmission line, and switching means responsive to the polarity of said transmission line after said pretermined delay time for actuating one or the other of said converters through application of said control pulse thereto.

4. A remote control system as defined in claim 3 wherein said control means includes an inverter, and a pair of similarly poled diodes connected respectively to the input and output of said inverter so as to provide an output from one of said diodes in response to a transition of either polarity on said transmission line.

5. A remote control system as defined in claim 4 wherein said control means further includes delay means comprising a transistor having its control electrode connected to said pair of diodes, a capacitor connected across the output of said transistor, a unijunction transistor having its emitter electrode connected to the output of said transistor, and a power supply connected to said capacitor for charging the same when said transistor is rendered non-conductive.

6. A remote control system as defined in claim 5 wherein said switching means includes a relay switch connecting the output of said unijunction transistor to one of two output contacts, a relay for actuating said relay switch connected to said transmission line, and bistable means connected between said output contacts and said converters for actuating one of said converters in response to receipt of an output signal on a given output terminal.

7. A remote control system as defined in claim 6 wherein said bistable means is a multivibrator.

References Cited

UNITED STATES PATENTS

| | | | |
|---|---|---|---|
| 2,708,744 | 5/1955 | Neiswinter | 340—163 |
| 2,904,624 | 9/1959 | Neiswinter | 178—4.1 |

THOMAS A. ROBINSON, Primary Examiner

U.S. Cl. X.R.

340—163